United States Patent [19]
Karppanen

[11] Patent Number: 5,862,621
[45] Date of Patent: Jan. 26, 1999

[54] FISHING POLE WITH ALARM

[76] Inventor: Heikki Karppanen, Elingonrannantie 132, FIN-97110 Rautiosaari, Finland

[21] Appl. No.: 750,204
[22] PCT Filed: Jun. 1, 1995
[86] PCT No.: PCT/FI95/00309
   § 371 Date: Nov. 27, 1996
   § 102(e) Date: Nov. 27, 1996
[87] PCT Pub. No.: WO95/33371
   PCT Pub. Date: Dec. 14, 1995

[30]    Foreign Application Priority Data

Jun. 2, 1994  [FI]  Finland .................................... 942607

[51] Int. Cl.⁶ ...................................................... A01K 97/12
[52] U.S. Cl. .............................................................. 43/17
[58] Field of Search ........................... 43/17, 25; 340/573

[56]               References Cited
             U.S. PATENT DOCUMENTS 1,337,292   4/1920   Timmons .................................... 43/17
   2,575,049  11/1951   Dean ......................................... 43/17
   4,202,126   5/1980   Pietrenka .................................. 43/17
   4,266,217   5/1981   Kao ........................................... 43/17
   4,276,711   7/1981   Mathauser ................................. 43/17

FOREIGN PATENT DOCUMENTS 2067091   10/1993   Canada ....................................... 43/17

Primary Examiner—Kurt Rowan
Attorney, Agent, or Firm—Larson & Taylor

[57]                    ABSTRACT

The invention relates to a fishing rod having guide rings for the line and incorporating an indicator device having a trigger wire for detecting the strike of a fish. The indicator device has a trigger wire which reacts to the flexing of the rod and a signaling means for issuing a signal as the rod bends by more than a preset amount. An adjustment mechanism presets the indicator sensitivity. The trigger wire passes through some or all of the line guides. The signaling means is an integrated unit for detachable mounting on the fishing rod.

6 Claims, 1 Drawing Sheet

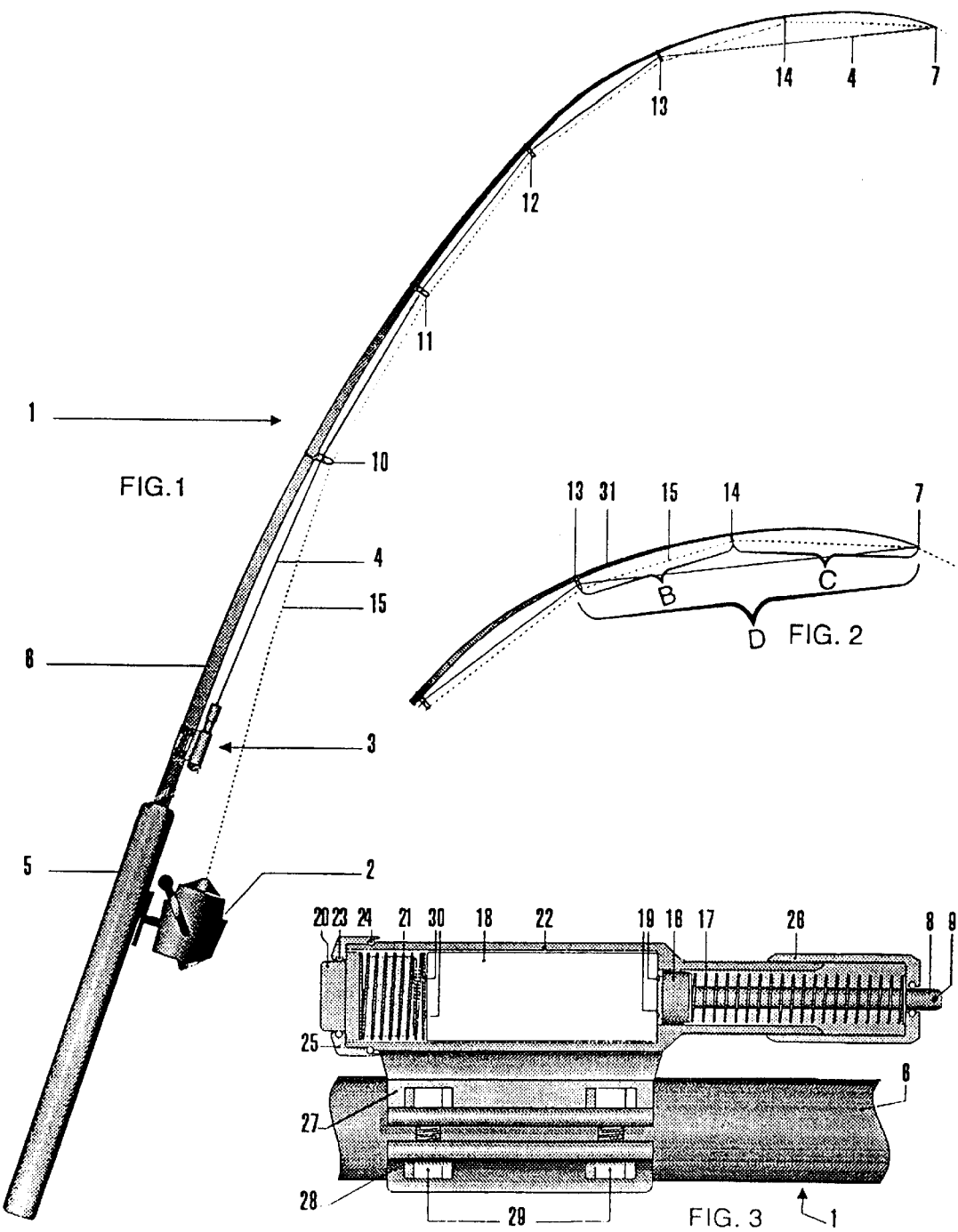

FISHING POLE WITH ALARM

The present invention relates to a fishing rod, advantageously a spinning rod or similar having guide rings for a line and incorporating an indicator device for detecting a strike by a fish, said indicator device comprising a signalling means for issuing a signal when the fishing rod is flexed by more than a preset amount, a mechanism capable of reacting to the flexing of the fishing rod, said mechanism incorporating a spring-loaded trigger wire or similar element, and an adjustment mechanism for presetting the indicator sensitivity, whereby the signalling means and the adjustment mechanism are designed into a self-contained integrated entity suited for detachable mounting to the butt section of the fishing rod. While said fishing rod is particularly well suited for casting a lure from a boat or similar vessel, its use is not limited to this application. This kind of fishing rod may also be used in ice/bridge fishing. The rod gives the fisherman an indication signal at a strike by the fish. By virtue of the novel facility, the fisherman can counter the strike by jerking the line during the initial part of the strike. By performing the counterjerk immediately at the instant of a fish strike (in practice, by a strong tug on the rod thus tensioning the line), the hooks of the lure can be made to penetrate on the mouth of the fish. This action has the result that the fish caught by the hook tip can be secured fully hooked by the hook barbs. Then, the hook(s) is/are penetrated so deep as to permit the barb to inhibit the detachment of the hook(s) from the fish jaws.

In the art is known from U.S. Pat. No. 4,458,438 a fishing rod incorporating a fish strike indicator constructed into the rod. This construction requires a special-design rod thus incurring a high cost. A portion of the components of the indicator device are integrated in the fishing rod handle, another portion in the butt section of the rod and still another portion located in the tip section of the rod, partially outside the rod. Such a device comprising a number of subassemblies is expensive to manufacture, sensitive to disturbance and clumsy to service. The rod tip section is provided with an adjustment mechanism for presetting the indication sensitivity. The need for indication sensitivity adjustment arises from, e.g., the use of different kinds of lures. Owing to the location of the adjustment mechanism in the rod tip and thus far removed from the user, the adjustment operation is in practice difficult to perform. Further, the ratchet-and-pawl mechanism of the adjustment mechanism forms a projection at the rod tip thus posing a fouling risk of the line with the ratchet of the mechanism.

The U.S. Pat. No. 4,051,616 discloses a fishing rod incorporating an indicator device. The indicator device comprises a strain gage, whose output signal is arranged to control the signalling means of the indicator device. The strain gage is located on the surface of the rod as a delicate component thus being vulnerable to damage.

It is an object of the present invention to offer an uncomplicated fishing rod-indicator device combination capable of overcoming the above-described drawbacks. The goal of the invention is achieved by an indicator device characterized in that the trigger wire is adapted to pass via the line guide rings so that it passes either through all or only some of the guide rings. The preferred embodiments of the fishing rod according to the invention are described in the specification.

The invention is based on the concept of utilizing the trigger wire taken through the line guide rings so that at the flexing of the fishing rod, the distance of the trigger wire from its fixing point near the tip of the rod to the indicator device is shortened with the flexing of the rod, whereby the trigger wire end adhering to the indicator device is displaced due to the spring-loaded fixing of the wire end, whereby said wire end displacement triggers the signalling means of the indicator device.

The major benefits of the indicator device according to the invention lie therein that it can be retrofitted to prior-art and conventional fishing and spinning rods, its trigger sensitivity adjustment mechanism is easy to use, it has an uncomplicated, compact and low-cost construction combined with low sensitivity to disturbance in practical use. Owing to these properties, the fishing rod increases the amount of catch. It offers simple maintenance and long service life.

The greatest benefits of the fishing rod according to the invention are therein that the rod may have a conventional construction, the indication sensitivity adjustment mechanism is effortless to use and risk of line involvement is eliminated. The adjustment mechanism has a simple, compact and inexpensive construction to manufacture yet acting reliably in practice. These characteristics contribute to larger catches in the use of the rod according to the invention as well as to its easy servicing and long life.

In the following, the invention will be examined in more detail by means of an advantageous embodiment with reference to the attached drawings, in which:

FIG. 1 shows a spinning rod according to the invention;

FIG. 2 shows an enlarged view of the tip of the spinning rod illustrating an essential detail of the invention; and FIG. 3 shows a longitudinally sectional side view of the indicator device employed in the spinning rod of FIG. 1.

Referring to FIG. 1, a spinning rod 1 is shown having the spinning reel 2 combined with an indicator device denoted by reference numeral 3 in its entity. It can be seen that the indicator device 3 is formed into a self-contained accessory mounted on a conventional fishing rod 1. The indicator device 3 is mounted about the butt end of the flexible butt section 6 of the rod 1, close to the butt foregrip 5. Details of the mounting means are illustrated in FIG. 3 (reference numerals 27–29).

The indicator device 3 comprises a signalling means which issues a signal when the spinning rod is flexed by a greater amount than a preset, adjustable limit. The amount of rod flexing is mediated to a trigger wire 4 which in cooperation with the spinning rod and the signalling means forms an important core of the invention. The trigger wire 4 is attached at its one end to the top ring 7 of the rod and at its opposite end to a hole 9 at the tip of a spring-loaded piston rod 8 of the indicator device; cf. FIG. 3, where the indicator device of FIG. 1 is shown in a sectional view. In the illustrated embodiment the trigger wire 4 is passed through all the line guide rings 7, 10–13 with the exception of the guide ring 14 located closest to the top ring 7. When the rod is flexed, the trigger wire 4 is spanned—contrary to the line 15—past the guide ring 14, cf. FIG. 2. By virtue of leaving the trigger wire 4 unpassed through at least one of the guide rings (e.g., guide rings 12–14) close to the tip of the rod, the straighter path of wire is appreciably shorter than the path of the line 15. The path difference A=B+C−D is in the order of a few millimeters. Owing to the straighter path of the wire, the spring-loaded piston rod 8 of the indicator device (cf. FIG. 3) is displaced to the left in the diagram, that is, inward in the body of the indicator device. As the piston rod 8 with a further amount of rod flexing is displaced sufficiently more to the left, also the piston-type contact element 16 at the left end of the piston rod is shifted by the expansion force exerted by a spring 17 to the left, whereby the supply contacts 19 of the signalling means 18 are brought to electrical contact with the opposing contact element. Resultingly, the indicator device issues a signal provided that the ON/OFF-type activation switch pushbutton 20 of the device is in the ON position thus arming the signalling means. The duration of the signal typically is in the order of a few seconds. Duration adjustment of the sonic signal can be added to the device. The signal is disabled by setting the activation switch pushbutton 20 into the OFF position. Hence, in the OFF position of the activation switch, no signal is issued even when the supply contacts 19 make an electrical contact. The momentary action of the activation switch pushbutton 20 is provided by a return spring 21. Reference numeral 30 denotes the contact tips of the activation switch.

With the exception of the trigger wire 4, the components of the indicator device are packaged into the indicator device housing 22. The housing 22 is environmentally sealed by means of seal rings 23, 24. Reference numeral 25 refers to an inner-threaded bushing-type cap. The signalling means adapted inside the housing 22 is not separately shown in the diagram nor the power supply required for the operation of the signalling means. Obviously, a conventional sound and/or visual annunciator (such as described in the U.S. Pat. No. 4,458,438) can be employed as the signalling means. Required operating power can be provided by a battery.

The indication sensitivity adjustment mechanism comprises an inner-threaded adjustment bushing 26 rotatable inward and outward along the housing 22 so as to adjust the initial tension of the spring 17 and the mutual distance between the contact element 16 and the supply contacts 19. A seal 14 adapted about the piston rod 8 makes the adjustment bushing watertight.

Referring to FIG. 3, the means for mounting the indicator device to the fishing rod 1 comprise two semicircular elements 27, 28 suited to be tightened against each other by means of screws 29 or similar members so as to encircle the rod.

In the use of the fishing rod according to the invention, the lure is lowered into water and the adjustment bushing 26 is set to a zeroing position. Subsequently, the indicator device is activated by pressing the activation switch pushbutton 20. The adjustment bushing 26 is rotated inward until the device issues a signal. Now the device is preadjusted. Next, the adjustment bushing 26 is rotated slightly outward and the activation switch pushbutton 20 is pressed again. The preadjustment setting is properly completed if no signal is issued at the pressing of the pushbutton. After these preliminary operations, as a strike of a fish and resulting flexing of the rod causes the contact element 16 to shift slightly to the left, the contact element meets the supply contacts 19, whereby a signal is issued. Then, the fisherman can jerk the rod in order to catch the fish positively to the hooks of the lure.

While the invention is in the above description illustrated with the help of only one of its preferred embodiments, it must be understood that the details of the invention can be implemented in varied manners within the scope and spirit of the appended claims. For instance, the trigger wire may be replaced by any oblong, flexible element. In lieu of the hole 9, any other suitable means can be used for fixing the trigger wire 4. The mounting location of the indicator device on the rod may be varied. Further, the indicator can be connected to a wireless device or equivalent communications means for transmitting the signals of the indicator device to an indicator light panel located in the interior of the fisherman's boat, whereby the strike of the fish is indicated by the turning-on of a signal lamp. Moreover, the boat may be equipped with a sonic annunciator. When a number of fishing rods is to be monitored, each rod can be provided with a dedicated signal lamp. A single- or multistrand wire can be used as the trigger wire.

I claim:

1. A fishing rod having guide rings for a line and incorporating an indicator device for detecting a strike of a fish, said indicator device comprising a signalling means for issuing a signal responsive to the flexing of the rod by more than a preset amount, a mechanism capable of reacting to the flexing of the fishing rod, said mechanism incorporating a spring-loaded trigger means, and an adjustment mechanism for presetting a sensitivity of the indicator, whereby the signalling means and the adjustment mechanism are designed into a self-contained integrated entity suited for detachable mounting to a butt section of the rod, the improvement comprising that the trigger means passes via at least two of the line guide rings, a mounting means for detachably mounting the device to the rod, a housing with space for an electrical power source, said housing having inside it a movable contact element spring-loaded with the help of a spring, said contact element having at its one end means for attaching said trigger means and being adapted to move actuated by said spring toward said supply contacts of signalling means for the purpose of establishing electrical contact with the supply contacts and thus supplying electrical power to said signalling means in order to issue a signal when a tension of relatively low magnitude is imposed by the flexing of the rod on said trigger means and the indicator sensitivity adjustment mechanism comprises a threaded adjustment bushing mounted on the outside of the rod and being rotatable movable in a longitudinal direction of the rod so as to adjust an initial tension of the spring and a distance between the contact element and the supply contacts.

2. A fishing rod as defined in claim 1, wherein the trigger means is attached to a top line guide ring of the rod and is passed through at least one additional line guide ring with the exception of a line guide ring (14) located closest to the top line guide ring.

3. A fishing rod as defined in claim 1, wherein the adjustment bushing is rotatably movable inward and outward along the housing so as to adjust the initial tension of the spring and a distance between said contact element and the supply contacts.

4. A fishing rod as defined in claim 1, wherein the rod incorporates a pushbutton spring loaded by means of a pushbutton loading spring, for the purpose of arming said signalling means, whereby a signal is issued as the supply contacts make an electrical contact.

5. A fishing rod as defined in claim 4, wherein, said pushbutton loading spring, said electrical power source, said signalling means, said contact element, said spring of the contact element and a piston rod are arranged in-line in the said housing.

6. A fishing rod as defined in claim 1, wherein said mounting means comprises two semicircular elements suited to be tightened against each other by means of screws or similar members so as to encircle the rod.

* * * * *